United States Patent
Herrmann et al.

(10) Patent No.: US 8,497,035 B2
(45) Date of Patent: Jul. 30, 2013

(54) BATTERY CELL INTEGRATED MEASUREMENT SENSOR LINE AND EQUALIZATION RESISTOR

(75) Inventors: Manfred Herrmann, Ginsheim-Gustavsburg (DE); Hartmut Stengelin, Mainz (DE); Peter Andres, Ginsheim-Gustavsburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 436 days.

(21) Appl. No.: 12/821,965

(22) Filed: Jun. 23, 2010

(65) Prior Publication Data

US 2011/0318632 A1    Dec. 29, 2011

(51) Int. Cl.
*H01M 2/02* (2006.01)
*H01M 2/30* (2006.01)

(52) U.S. Cl.
USPC ............................. 429/176; 429/120; 429/178

(58) Field of Classification Search
None
See application file for complete search history.

(56) References Cited

U.S. PATENT DOCUMENTS

| | | | |
|---|---|---|---|
| 4,347,292 A * | 8/1982 | Bernard et al. | 429/65 |
| 2006/0093896 A1 * | 5/2006 | Hong et al. | 429/61 |
| 2008/0241653 A1 | 10/2008 | Chang | |
| 2009/0258288 A1 * | 10/2009 | Weber et al. | 429/120 |
| 2011/0180291 A1 | 7/2011 | Matthias | |

FOREIGN PATENT DOCUMENTS

DE    10 2006 059 989 A1    6/2008

* cited by examiner

*Primary Examiner* — John S Maples
(74) *Attorney, Agent, or Firm* — John A. Miller; Miller IP Group, PLC

(57) ABSTRACT

A battery cell for an electric vehicle battery pack, including surface-applied wires to facilitate connecting the cell to a controller. Resistive or non-resistive wiring is printed onto or otherwise applied to the outer surface of the battery cell, to eliminate the need for separate jumper wires routed around or through the battery pack. A surface-applied wire is directly connected to each terminal of the battery cell, and each wire is routed on the outer surface of the cell to a location convenient for connecting a cell monitoring controller. The surface-applied wires can be made of a suitable resistive material, such that the resistance of each wire is known and the wires can be used for dissipating power during cell state of charge equalization. An insulating layer can be applied over the surface-applied wire to minimize the risk of short circuit.

17 Claims, 2 Drawing Sheets

BATTERY CELL INTEGRATED MEASUREMENT SENSOR LINE AND EQUALIZATION RESISTOR

BACKGROUND OF THE INVENTION

1. Field of the Invention

This invention relates generally to a battery cell with integrated external wiring and, more particularly, to a battery cell for an electric vehicle battery pack which includes printed-on or surface-applied wires on the exterior of the cell, where the wires connect the positive and negative terminals of the cell to a location convenient for the attachment of a cell monitoring controller, and the wires can be resistive to facilitate cell discharging for the purpose of state of charge equalization.

2. Discussion of the Related Art

Electric vehicles and gasoline/electric hybrid vehicles are rapidly gaining popularity in today's automotive marketplace. Electric and hybrid vehicles offer several desirable features, such as reduced emissions, reduced usage of petroleum-based fuels, and potentially lower operating costs. A key component of both electric and hybrid vehicles is the battery pack. Battery packs in these vehicles typically consist of numerous interconnected cells, which can deliver a lot of power on demand. In order to maximize vehicle driving range and maximize battery pack life, the cells in the battery pack must be controlled during charging and discharging so that all cells are maintained at a fairly uniform charge level, and within a prescribed temperature range.

In many battery packs, each cell is connected to a cell monitoring controller, which monitors voltage and temperature conditions in each cell, and controls charging and discharging current. The positive and negative terminals of each battery cell are typically connected to a cell monitoring controller via jumper wires. Connecting the jumper wires to both the cell terminals and the cell monitoring controller requires extra steps in the assembly of the battery pack, and the jumper wires represent extra parts which must be handled during battery pack assembly. In addition, it is often impractical to attach the cell monitoring controller jumper wires after battery pack assembly, as the terminals are physically inaccessible at that point.

Individual battery cells must sometimes be discharged slightly in order to equalize the state of charge between cells. This discharging is currently also handled by the cell monitoring controllers. However, dissipating power through a resistor in the cell monitoring controller is not an ideal situation, as the resultant heat causes the temperature of the circuit board in the cell monitoring controller to increase. Adding a heat dissipation feature to the cell monitoring controller further raises the cost of that device.

It would be advantageous to apply wiring directly to the outside surface of the battery cell, via a wire printing technique or otherwise. Such surface-applied wiring could be directly connected to the terminals of the cell and could be routed to a location convenient for connection to the cell monitoring controller. Using resistive wiring for this purpose would also allow the surface-applied wires to serve as power-dissipating resistors for state of charge equalization, and the resultant heat to be absorbed in the battery cell, enabling simplification and cost reduction of the cell monitoring controller.

SUMMARY OF THE INVENTION

In accordance with the teachings of the present invention, a battery cell including surface-applied wires to facilitate connecting the cell to a controller is disclosed. Wire or conductive material is printed onto or otherwise applied to the outer surface of the battery cell, which is used in an electric or hybrid vehicle battery pack. A surface-applied wire is directly connected to each terminal of the battery cell, and each wire is routed on the outer surface of the cell to a location convenient for connecting a cell monitoring controller, thus eliminating the need for separate jumper wires routed around or through the battery pack. The surface-applied wires can be made of a suitable resistive material, such that the resistance of each wire is known and the wires can be used for dissipating power during cell state of charge equalization. An insulating layer can be included over the surface-applied wire to minimize the risk of short circuit.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a battery cell with an integrated measurement sensor line and equalization resistor is merely exemplary in nature, and is in no way intended to limit the invention or its applications or uses. For example, the present invention has particular application for electric and hybrid vehicle battery pack cells. However, the invention could be applied to other types of battery pack cells, such as those used in forklifts and other utility vehicles, electrical storage and battery back-up power devices, and other industries.

Electric vehicles and gasoline/electric hybrid vehicles use high-capacity battery packs to store the electrical energy necessary for driving the vehicles a reasonable distance between recharging events. Battery technology continues to develop, and many different battery pack system designs are possible, but one requirement that most electric and hybrid vehicle battery packs have in common is the need for advanced electronic monitoring and controls. Electric and hybrid vehicle battery packs typically include monitoring and control units which monitor voltage in each cell and temperature conditions throughout the battery pack, and control charging and discharging current. Maintaining cell temperature within a prescribed range, and balancing state of charge between cells, are important considerations in optimizing the performance and the life of the battery pack.

Most modern electric vehicles use lithium-ion battery pack cells. Many different designs of battery packs and battery cells have been developed, with common battery cells including cylindrical and prismatic shapes. A new type of battery pack and battery cell design has recently come into favor, where the battery cell is generally flat and rectangular in shape, and the battery pack includes a number of these battery cells in a stack, with other components, such as cooling plates, sandwiched between the cells. The flat, rectangular battery cells used in stack-type battery packs are often called pouch cells.

Figure 1:
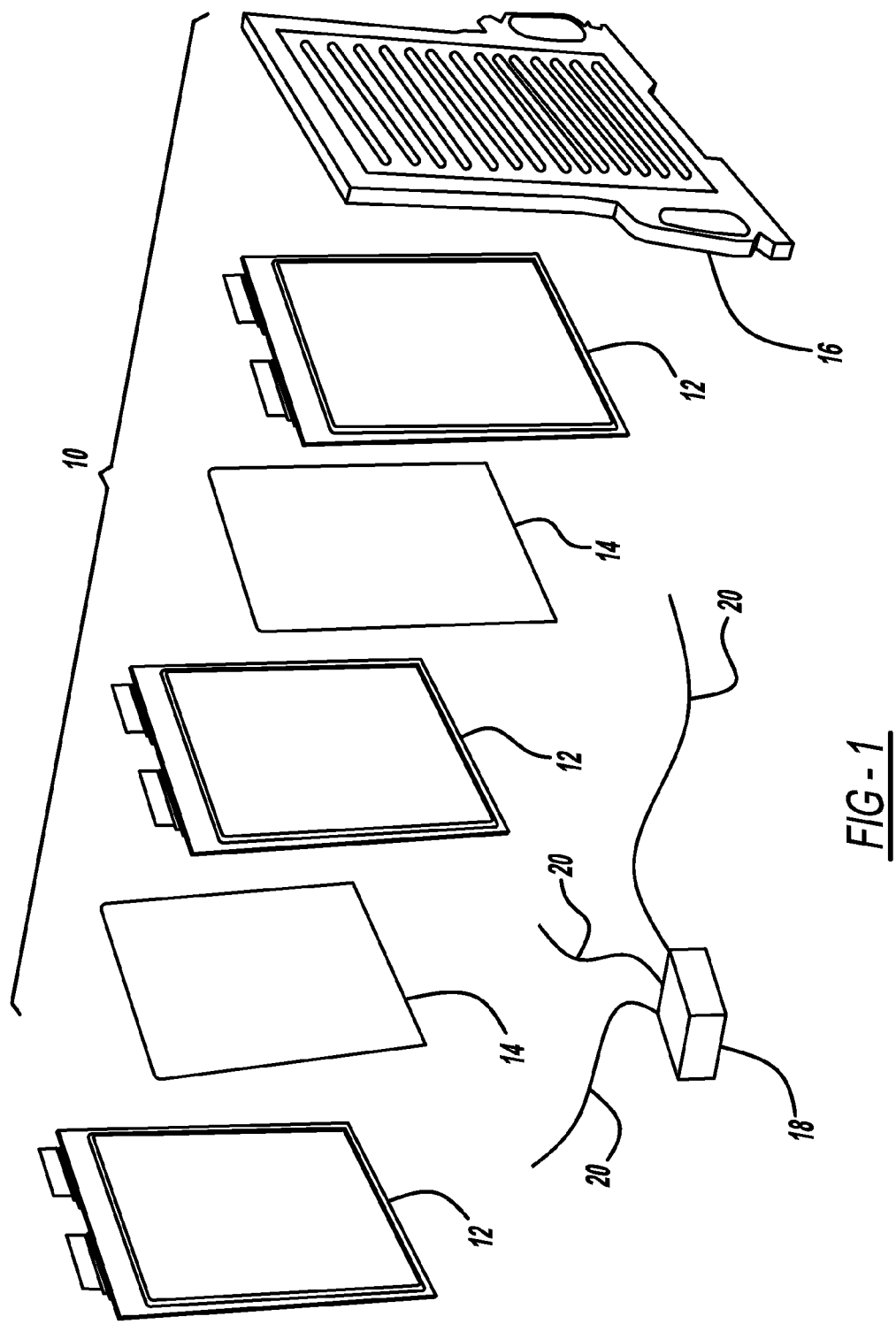
FIG. 1 is an exploded illustration of a battery pack, showing how battery cells are stacked with other components in an assembly.

FIG. 1 is an exploded illustration of a battery pack 10. The battery pack 10 includes a plurality of pouch-type battery cells 12, separated by cooling plates 14. An end frame 16 is also included. Other frame pieces, spacers, fasteners, and other components are omitted from FIG. 1 for clarity. A cell monitoring controller 18 is connected to each terminal of the cells 12 in order to monitor the voltage and control the charging and discharging current in each of the cells 12. Lead wires 20 are used to connect the cell monitoring controller 18 to each terminal of the cells 12, discussion of which is included below. The cell monitoring controller 18 also typically monitors temperature conditions throughout the battery pack 10, via sensors and wires which are not shown.

Figure 2:
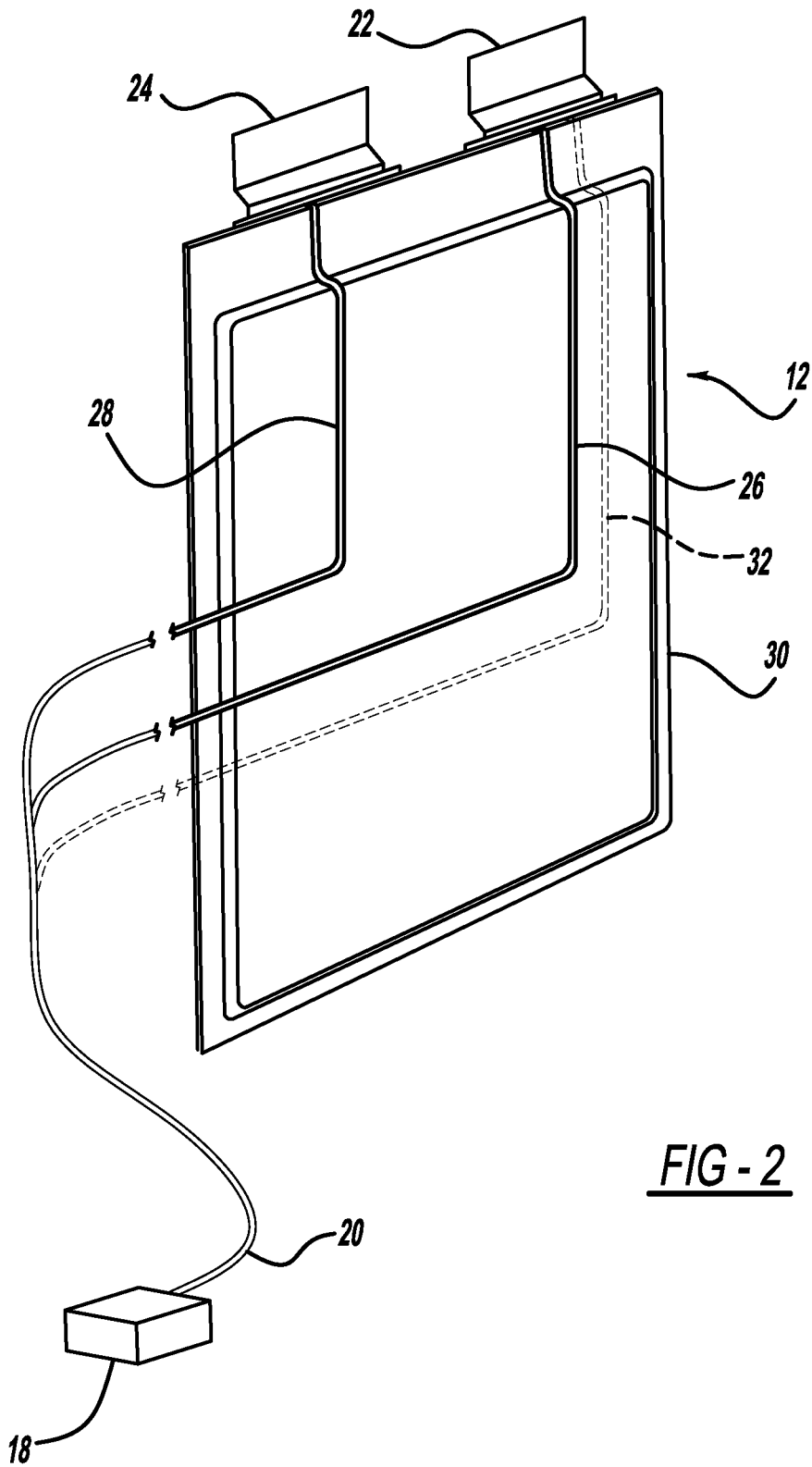
FIG. 2 is an illustration of a battery cell, including surface-applied wiring according to the present invention.

FIG. 2 is an illustration of one of the battery cells 12 separated from the battery pack 10, including more detail and showing the features of the present invention. The battery cell 12 includes an outer case 30, which may be comprised of a rigid material or a flexible material. The case 30 contains an anodic material, a cathodic material, and an electrolyte, which are not shown in FIG. 2. In a popular lithium-ion battery chemistry, the anode is comprised of a carbon-based material such as graphite, the cathode is comprised of a metal oxide such as lithium cobalt oxide, and the electrolyte is comprised of lithium salts in an organic solvent. Many other materials, construction techniques, and electrochemical processes used in battery cells, such as the cell 12, are known in the art and will not be discussed in detail here.

The cell 12 also includes a positive terminal 22 and a negative terminal 24. In this illustration, the positive terminal 22 and the negative terminal 24 are located on the same end of the battery cell 12, however, other configurations are possible, such as where one terminal is located on each end of the cell 12. The lead wires 20, each set of which includes at least one positive and one negative wire, are used to connect the cell monitoring controller 18 to the terminals 22 and 24. However, it can be difficult to connect the lead wires 20 directly to the terminals 22 and 24 in the tight confines of the battery pack 10.

During assembly of the battery pack 10, the terminals 22 and 24 of the cell 12 may be pressed or snapped into position in electrical busses or channels, thus making them virtually inaccessible for soldering or otherwise connecting wires. The inaccessibility of the terminals 22 and 24 is compounded by the fact that the cell 12 is tightly stacked between the cooling plates 14 during assembly of the battery pack 10, making it problematic to attach the lead wires 20 from the cell monitoring controller 18 to the terminals 22 and 24 of the cell 12. This problem can be resolved by adding surface-applied wires 26 and 28 to the exterior of the case 30.

The surface-applied wires 26 and 28 need to be flat, so that the case 30 maintains good physical contact with the adjacent cooling plate 14 and heat from the cell 12 can be conducted into the cooling plate 14. Various technologies exist for applying thin-film or generally flat conductors to a surface, such as the surface of the case 30. One technique is to print the conductor onto the surface, similar to the way conductive paths are applied to printed circuit boards. Another approach is to use preformed flat wire material, shaped appropriately for the desired route, and adhere the wire material to the surface of the case 30. In either approach, the surface-applied wires 26 and 28 need to be electrically connected to the terminals 22 and 24, respectively. The surface-applied wires 26 and 28 would preferably be covered with a layer of insulating material (not shown), so as to prevent an accidental short circuit between the two. While the surface-applied wires 26 and 28 are shown in FIG. 2 as being routed across the face of the case 30, it may be advantageous to route the surface-applied wires 26 and 28 along the thinner peripheral edges of the case 30, so as to avoid adding any thickness at all to the cell 12.

As shown in FIG. 2, the surface-applied wire 26 is routed from the positive terminal 22 to a location along one edge of the case 30. Likewise, the surface-applied wire 28 is routed from the negative terminal 24 to a location along the same edge of the case 30. This arrangement allows for convenient connection of the lead wires 20, either during or after the assembly of the battery pack 10. As mentioned above, the surface-applied wires 26 and 28 would be printed directly onto, or otherwise attached to, the terminals 22 and 24, respectively, when the surface-applied wires 26 and 28 are being applied to the case 30. The surface-applied wires 26 and 28 could be terminated at the ends opposite the terminals 22 and 24 in any of several ways. If the surface-applied wires 26 and 28 are printed on the surface of the case 30, then the case 30 could have small metal terminals (not shown) crimped or otherwise attached to its edge, and the surface-applied wires 26 and 28 could be printed right onto the small metal terminals. If the surface-applied wires 26 and 28 are comprised of a preformed wire material, the wire material could be extended beyond or wrapped around the edge of the case 30, thus providing a convenient attachment location for the lead wires 20. The incorporation of the surface-applied wires 26 and 28 onto the case 30 eliminates the routing of loose wires through or around the battery pack 10, and solves the problem of connecting the cell monitoring controller 18 to the terminals 22 and 24, thus making the assembly and handling of the battery pack 10 simpler and less error prone.

Another feature which can readily be incorporated into the surface-applied wires 26 and 28 is to make them resistive, and to use the resultant resistance to dissipate power during cell state of charge equalization. As described above, it is often necessary to dissipate some power from one or more of the cells 12 in the battery pack 10 during operation of the electric or hybrid vehicle. This is because the charging and discharging performance of individual cells 12 may vary, and this creates a situation where one cell 12 may have a higher or lower voltage and state of charge than another cell 12. This difference in state of charge is detected by the cell monitoring controller 18, and is corrected by a process known as equalization, where some power is dissipated from the cells 12 which are at a higher state of charge. In current battery pack systems, the power is dissipated across resistors in the cell monitoring controller 18 during equalization. This is not an optimal situation, as the circuit boards in the cell monitoring controller 18 are not generally equipped with cooling systems, and there could be situations where many watts of power must be dissipated during equalization, thus causing circuit boards in the cell monitoring controller 18 to get too hot.

Using the surface-applied wires 26 and 28 as resistors for equalization eliminates the need to absorb and dissipate equalization heat in the circuit boards in the cell monitoring controller 18. Instead, when one or more of the cells 12 needs to have power bled off for state of charge equalization, the cell monitoring controller 18 can simply close a circuit to allow current to flow through the resistive surface-applied wires 26 and 28. By choosing the resistivity of the wire material used for the surface-applied wires 26 and 28, the resultant resistance can be tailored as needed for equalization, and no power needs to be dissipated within the cell monitoring controller 18 at all. In this way, all of the power dissipation takes place in the surface-applied wires 26 and 28, which are in direct thermal contact with cells 12 and the cooling plates 14. A battery pack cooling system, of which the cooling plates 14 are constituents, can easily absorb the power dissipated during state of charge equalization. There are also situations where the battery cells 12 need to be warmed up in order to get their temperature into an optimal operating range. In such situations, it is desirable for the heat from the equalization power to be dissipated into the cells 12, and this is enabled by using the surface-applied wires 26 and 28 as resistors.

In one non-limiting embodiment, the voltage of the cell 12 is about 4 volts, and the target equalization current is 100 milliamps (mA). This dictates that the total resistance of the surface-applied wires 26 and 28 is equal to 40 ohms, or approximately 20 ohms each if both of the surface-applied wires 26 and 28 are resistive. However, many variations are possible, including using less total resistance in order to increase the equalization current and reduce equalization time, using different resistances in the surface-applied wires 26 and 28, and making only one of the surface-applied wires 26 or 28 resistive.

Another advantage to making the surface-applied wires 26 and 28 resistive is the reduced risk of accidentally short-circuiting the terminals 22 and 24 during battery pack assembly or service, or in the event of an accident. During assembly of a conventional battery pack 10, wiring connections of some sort must be made directly to the terminals 22 and 24. If a wire or tool were to accidentally create a short circuit between the terminals 22 and 24, the resultant near-zero resistance path would cause very high current, which could damage the cell 12 or other components. The same situation exists during battery pack service activities. A vehicle accident could also cause the lead wires 20 to come into contact with each other and effectively short-circuit the positive and negative terminals 22 and 24. To overcome this problem, a fuse is sometimes designed into battery cells such as the cell 12, in order to interrupt a short circuit before any damage is done. However, by adding resistance to the surface-applied wires 26 and 28, the need for a fuse is eliminated. This is because the connection of the lead wires 20 takes place at the ends of the surface-applied wires 26 and 28 remote from the terminals 22 and 24, and if those remote ends are accidentally brought into contact, there is sufficient resistance in the circuit to prevent a destructively high current. Avoiding the need for a fuse allows the cell 12 to be simpler and lower in cost.

Because the goal of state of charge equalization is to lower the state of charge in one or more of the cells 12 to a particular value, it is sometimes necessary to measure cell voltage, which is an indicator of state of charge, during the equalization process. In order to measure cell voltage accurately, it may be helpful to add a third surface-applied wire 32 to the surface of the case 30. In one embodiment, the surface-applied wires 26 and 28 would be made non-resistive, and the surface-applied wire 32 would be resistive. In the context used here, non-resistive means a resistance near zero ohms, such as would be achieved by using a copper wire of a cross-sectional area at least equivalent to an 18-20 gauge wire. The resistive surface-applied wire 32, which would facilitate equalization power dissipation, could be connected to either the positive terminal 22 or the negative terminal 24 of the cell 12 and routed on the surface of the case 30 to a location convenient for the attachment of the lead wires 20, which would include a second positive or negative wire. The non-resistive surface-applied wires 26 and 28 would allow the cell monitoring controller 18 to get a true reading of the voltage of the cell 12, even when equalization power is being dissipated through the resistive surface-applied wire 32.

It may also be possible to configure the cell monitoring controller 18 to accurately estimate the voltage of the cell 12 during equalization, without using any non-resistive wires. This could be accomplished by accounting for the voltage drop across the known resistance of the surface-applied wires 26 and 28 due to a known equalization current, or by switching off the equalization current during voltage measurement. It may also be desirable to include a fourth surface-applied wire (not shown), where two wires are resistive and two wires are non-resistive. A combination of resistive and non-resistive wires may be used if that approach is shown to be most accurate or cost-effective for a particular application.

Although the above discussion of surface-applied wiring is mostly in terms of its application to pouch type battery cells, such as the cell 12, the same approach may be applicable to other types of battery cells, such as cylindrical or prismatic shapes. Regardless of the type of battery cell to which it is applied, the use of resistive or non-resistive surface-applied wiring can bring many benefits to a manufacturer of battery packs—including easier and more robust assembly of the battery packs, improved thermal management of the battery packs and controllers, elimination of loose jumper wires and other components, and ultimately lower cost.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A battery cell, comprising:
a case having an exterior surface;
an anodic material, a cathodic material, and an electrolyte contained in the case;
a positive terminal and a negative terminal;
a first flat wire applied to the exterior surface of the case, where one end of the first flat wire is in electrical contact with the positive terminal, and the other end of the first flat wire terminates near an edge of the case so as to enable connection to a first lead wire;
a second flat wire applied to the exterior surface of the case, where one end of the second flat wire is in electrical contact with the negative terminal, and the other end of the second flat wire terminates near the edge of the case so as to enable connection to a second lead wire; and
a third flat wire applied to the exterior surface of the case, where the third flat wire has a resistance that is effective for dissipating excess charge energy from the battery cell, one end of the third flat wire is in electrical contact with either the positive terminal or the negative terminal, and the other end of the third flat wire terminates near the edge of the case so as to enable connection to a third lead wire.

2. The battery cell of claim 1 wherein the first flat wire and the second flat wire are printed onto the exterior surface of the case.

3. The battery cell of claim 1 wherein the first flat wire and the second flat wire include a preformed wire material which is adhered to the exterior surface of the case.

4. The battery cell of claim 1 wherein the first flat wire and the second flat wire have a resistance that is effective for dissipating excess charge energy from the battery cell.

5. The battery cell of claim 4 wherein the resistance is between 5 and 100 ohms.

6. The battery cell of claim 1 wherein the first flat wire and the second flat wire include a covering layer of insulating material.

7. The battery cell of claim 1 wherein the battery cell is part of a battery pack for an electric vehicle, and the first lead wire and the second lead wire are attached to a cell monitoring controller.

8. A battery cell for an electric vehicle battery pack, comprising:
- a case having an exterior surface;
- an anodic material, a cathodic material, and an electrolyte contained in the case;
- a positive terminal and a negative terminal;
- a first flat wire applied to the exterior surface of the case, where one end of the first flat wire is in electrical contact with the positive terminal, the other end of the first flat wire terminates near an edge of the case so as to enable connection to a first lead wire, and the first flat wire has a resistance that is between 5 and 100 ohms; and
- a second flat wire applied to the exterior surface of the case, where one end of the second flat wire is in electrical contact with the negative terminal, the other end of the second flat wire terminates near the edge of the case so as to enable connection to a second lead wire, and the second flat wire has a resistance that is between 5 and 100 ohms.

9. The battery cell of claim 8 wherein the first flat wire and the second flat wire are printed onto the exterior surface of the case.

10. The battery cell of claim 8 wherein the first flat wire and the second flat wire include a preformed wire material which is adhered to the exterior surface of the case.

11. The battery cell of claim 8 wherein the first flat wire and the second flat wire include a covering layer of insulating material.

12. The battery cell of claim 8 wherein the first lead wire and the second lead wire are attached to a cell monitoring controller.

13. A battery pack for an electric vehicle, said battery pack comprising:
- a plurality of battery cells, where each battery cell includes a case having an exterior surface, an anodic material inside the case, a cathodic material inside the case, an electrolyte inside the case, a positive terminal, a negative terminal, a first flat wire applied to the exterior surface of the case, and a second flat wire applied to the exterior surface of the case, where one end of the first flat wire is in electrical contact with the positive terminal and the other end of the first flat wire terminates near an edge of the case so as to enable connection to a first lead wire, and one end of the second flat wire is in electrical contact with the negative terminal and the other end of the second flat wire terminates near the edge of the case so as to enable connection to a second lead wire, and each battery cell further includes a third flat wire applied to the exterior surface of the case of each battery cell, where the third flat wire has a resistance that is effective for dissipating excess charge enemy from the battery cell, one end of the third flat wire is in electrical contact with either the positive terminal or the negative terminal, and the other end of the third flat wire terminates near the edge of the case so as to enable connection to a third lead wire; and
- a plurality of cooling plates interspersed between the plurality of battery cells.

14. The battery pack of claim 13 wherein the first flat wire and the second flat wire are printed onto the exterior surface of the case.

15. The battery pack of claim 13 wherein the first flat wire and the second flat wire include a preformed wire material which is adhered to the exterior surface of the case.

16. The battery pack of claim 13 wherein the first flat wire and the second flat wire each have a resistance that is effective for dissipating excess charge energy from the battery cell.

17. The battery pack of claim 13 wherein the first flat wire and the second flat wire include a covering layer of insulating material.

* * * * *